United States Patent [19]
Zenz, Sr.

[11] Patent Number: 5,841,425
[45] Date of Patent: Nov. 24, 1998

[54] AMBIDEXTROUS COMPUTER INPUT DEVICE

[75] Inventor: Charles Vernon Zenz, Sr., Rochester, Minn.

[73] Assignee: International Business Machines Corporation, Armonk, N.Y.

[21] Appl. No.: 688,972

[22] Filed: Jul. 31, 1996

[51] Int. Cl.$^6$ .................................................. G09G 5/08
[52] U.S. Cl. ........................................ 345/163; 345/158
[58] Field of Search ................................ 345/156, 157, 345/158, 161, 163, 164, 165, 166, 167, 179; 341/20, 21, 23; 463/30, 36, 37, 38, 46

[56] References Cited

U.S. PATENT DOCUMENTS

| | | |
|---|---|---|
| 4,939,508 | 7/1990 | Lawrence et al. . |
| 5,006,836 | 4/1991 | Cooper . |
| 5,122,785 | 6/1992 | Cooper . |
| 5,186,629 | 2/1993 | Rohen ..................... 345/163 |
| 5,287,090 | 2/1994 | Grant . |
| 5,298,919 | 3/1994 | Chang ..................... 345/163 |
| 5,301,222 | 4/1994 | Fujiwara ................. 345/179 |
| 5,382,962 | 1/1995 | Young . |
| 5,432,510 | 7/1995 | Matthews . |
| 5,648,798 | 7/1997 | Hamling .................. 345/163 |

*Primary Examiner*—Chanh Nguyen
*Attorney, Agent, or Firm*—Karuna Ojanen; Merchant, Gould, Smith, Edell, Welter & Schmidt

[57] ABSTRACT

An ambidextrous computer input device having a control circuit and at least one sensor to detect the presence of a human digit, such as a thumb or a finger. The sensor is unobtrusively positioned on the input device, such as a mouse or a trackball or a keyboard point device. Upon detection or lack of detection of the thumb or finger, the control circuit automatically configures the buttons on the device to activate primary or secondary software functions either for a left-handed person or a right-handed person.

25 Claims, 20 Drawing Sheets

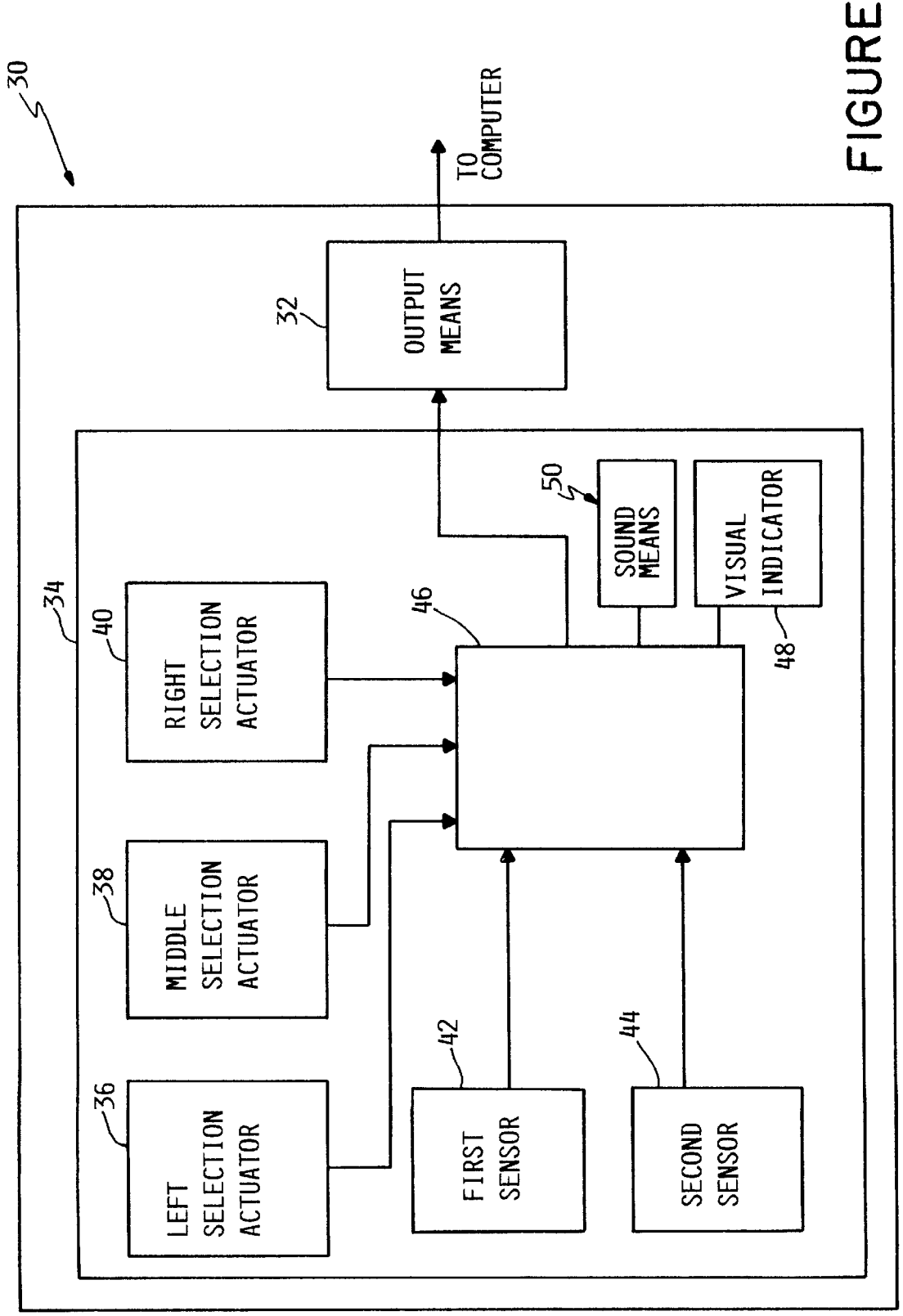

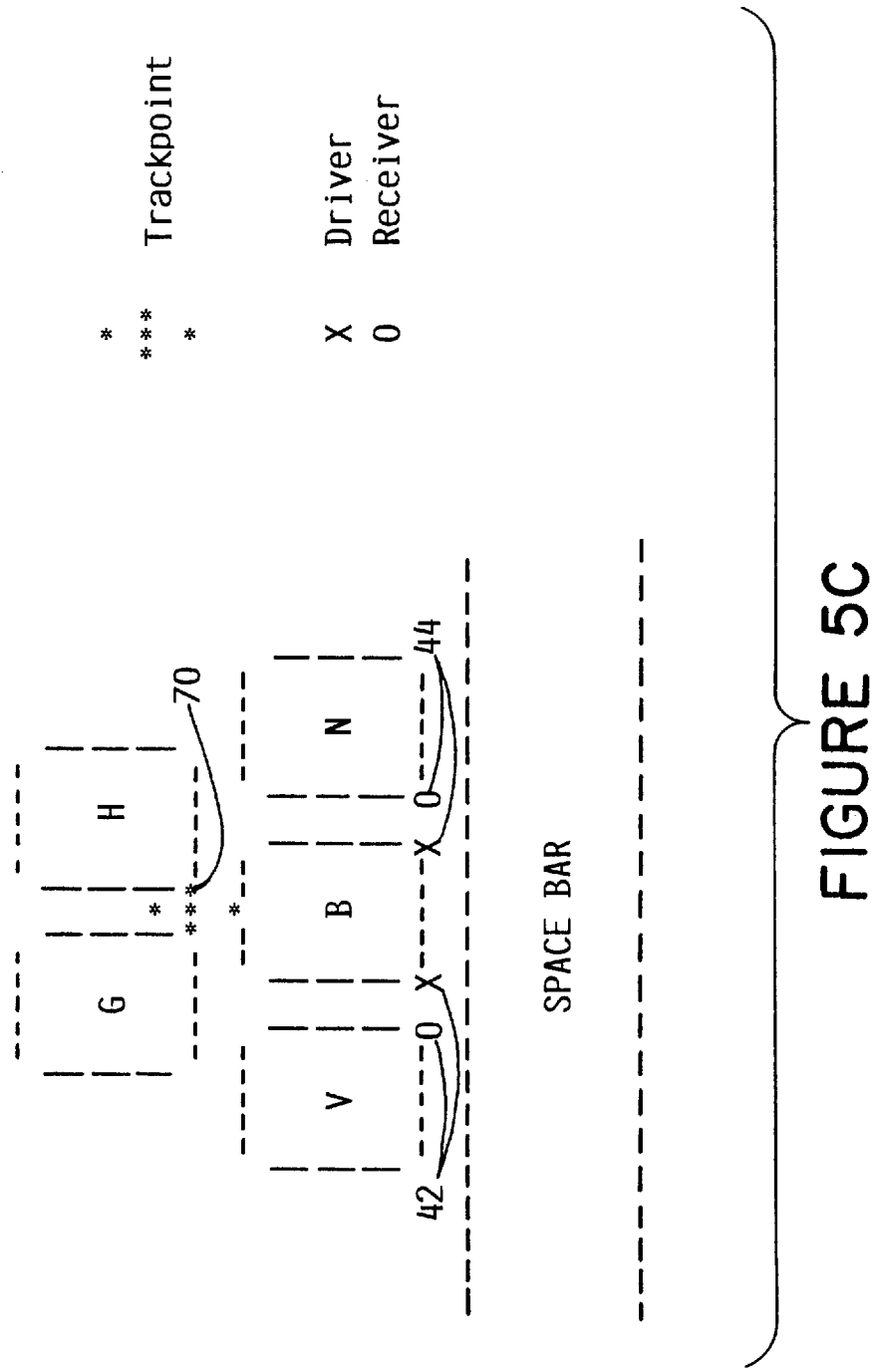

AMBIDEXTROUS COMPUTER INPUT DEVICE

BACKGROUND OF THE INVENTION

1. Technical Field of the Invention

This invention relates generally to a computer input device, such as a mouse, trackball or a directional rod on a keyboard, for controlling displays and other operations within computer systems; and more particularly to a computer input device having at least one sensor and an electronic circuit which, depending upon the state of the sensor, automatically determines whether the device is operating in a left-handed or a right-handed mode.

2. Background Information

The computer mouse is well known and consists of a shell, a spherical ball on the bottom side of the shell and an output means for interface with the computer. As the mouse slides across a surface, the sphere rotates within the shell. The movement of the mouse on a surface corresponds with the movement of a cursor or other indicator on the computer display. A mouse also includes selection actuators such as buttons on the top surface of the shell which can be activated by pressing them. When activated, the selection actuators send a signal to the computer to perform a function. Activation of each selection actuator can result in a different function being performed.

A typical mouse configured for a right-handed person has two selection actuators, a left selection actuator and a right selection actuator, and sends a primary function, i.e., a function performed more frequently, signal to the computer when the left selection actuator is activated. When the right selection actuator is activated, the mouse sends a secondary function signal to the computer. The reason the left selection actuator corresponds with the primary function for a right-handed user is that the left selection actuator is directly below the user's index finger. A person's index finger generally has more dexterity and strength than other fingers so it is desired that the primary function correspond with the user's index finger. A mouse configured so that the index finger of the hand operating the mouse is directly over the selection actuator corresponding to the primary function is said to be configured to operate with that hand.

Another example of a computer input device, the trackball, consists of a sphere on the top surface of a shell so that a user can rotate the sphere with their fingers or thumb. The rotating sphere can also be placed on or attached to the top surface of the keyboard. There are typically two or more selection actuators with the ease of access to any given selection actuator dependent upon which hand is operating the trackball.

Another example of a directional computer input device, especially for laptop computers, is a small stick or cylindrical rod extending from the keys on the keyboard. As the user presses against the extension, it pivots and the cursor on a computer display moves according to the range of motion of the rod. Selection actuators exist on the keyboard to select software features displayed on the monitor or screen. The TRACKPOINT® computer input device is one such device and includes a small stick attached to the keyboard above the "B" key and between the "G" and "H" keys. Selection actuators below the space bar are activated when the user presses on them with a thumb.

For all computer input devices, it is important that the selection actuator to which the user has the easiest access corresponds to the primary function. Selection actuators which are harder or more awkward to reach should correspond to secondary functions. Therefore, the determination of which selection actuator is the primary selection actuator depends upon which hand is operating the computer input device.

Greater than a majority of people are right-handed and, therefore, computer input devices typically have been configured so that the selection actuator corresponding to the primary function is easily accessible by the right-handed person. For example, the primary function signal typically corresponds to the left selection actuator on a mouse. When a left-handed person uses such a computer input device, they must reconfigure the computer input device by making changes in the system software, or they must manually flip a switch, or they must operate the computer input device in an awkward way such that the selection actuator hardest to access corresponds with the primary function.

The prior art includes computer input devices in which the user must manually flip a switch to change from one hand to the other. U.S. Pat. No. 5,287,090 to Grant discloses a mouse with a manual switch. To switch from right-handed use to left-handed use, the user must rotate a manual switch and then turn the mouse 180° so that the cord running to the computer is always on the non-thumb side of the user's hand.

U.S. Pat. No. 5,432,510 to Matthews discloses a single hand data management device which is capable of switching hand configuration when the user manually pushes a button or switch. The device disclosed in Matthews requires a conscious effort by the user to activate the switch by pushing it until the switch clicks. The younger or novice user may not realize that this need be done nor know how to manually change handedness.

U.S. Pat. No. 5,382,962 to Young discloses a palm-top computer which sits on the user's hand. To convert the palm-top computer from left-handed mode to right-handed mode or vice versa, a switch must be manually flipped.

To switch a computer input device from left-handed configuration to right-handed configuration or vice versa, the present art requires a conscious effort by the user to either flip a switch or to reconfigure the system software. To many computer users, these steps may not be known and, therefore, the left-handed user may be forced to operate a computer input device configured for a right-hand and a right-handed user may be forced to operate a computer input device configured for a left-hand.

SUMMARY OF THE INVENTION

The present invention solves the problem of having to either manually change the handedness of a computer input device or to make changes in the system software. The invention is the placement of a sensor in the computer input device, such as a mouse, which detects the presence of a finger or other human digit. The handedness of the device is determined internally within the device and automatically. Once the handedness is determined, then the configuration circuit further configures primary and secondary functions to the selection actuators. Thus, what has been invented is a computer input device comprising an output means for communicating with a computer, and a control circuit coupled to the output means, the control circuit wherein the control circuit further comprises at least a first sensor and additional electronics to automatically determine the handedness of the computer input device. The means for automatically determining handedness causes the computer input device to be in a first-handed mode when the first sensor is activated, and causes the computer input device to be in a second-handed mode when the first sensor is not activated. Moreover, a second sensor can be added to the device; light and sound messages can be communicated to the user of the device to indicate either the handedness of the device or that an error condition occurs because either none or both of the sensors detect the presence of a human digit or other object.

BRIEF DESCRIPTION OF THE DRAWINGS

FIG. 2 is a block diagram of one embodiment of the computer input device of this invention.

FIG. 5b is a drawing of a left hand manipulating such an extension of FIG. 5a.

FIG. 5c is a drawing of the present system embodied in a computer input device using the rod/stick extending from the keyboard and showing the placement of sensors.

DESCRIPTION OF THE INVENTION

Figure 1:
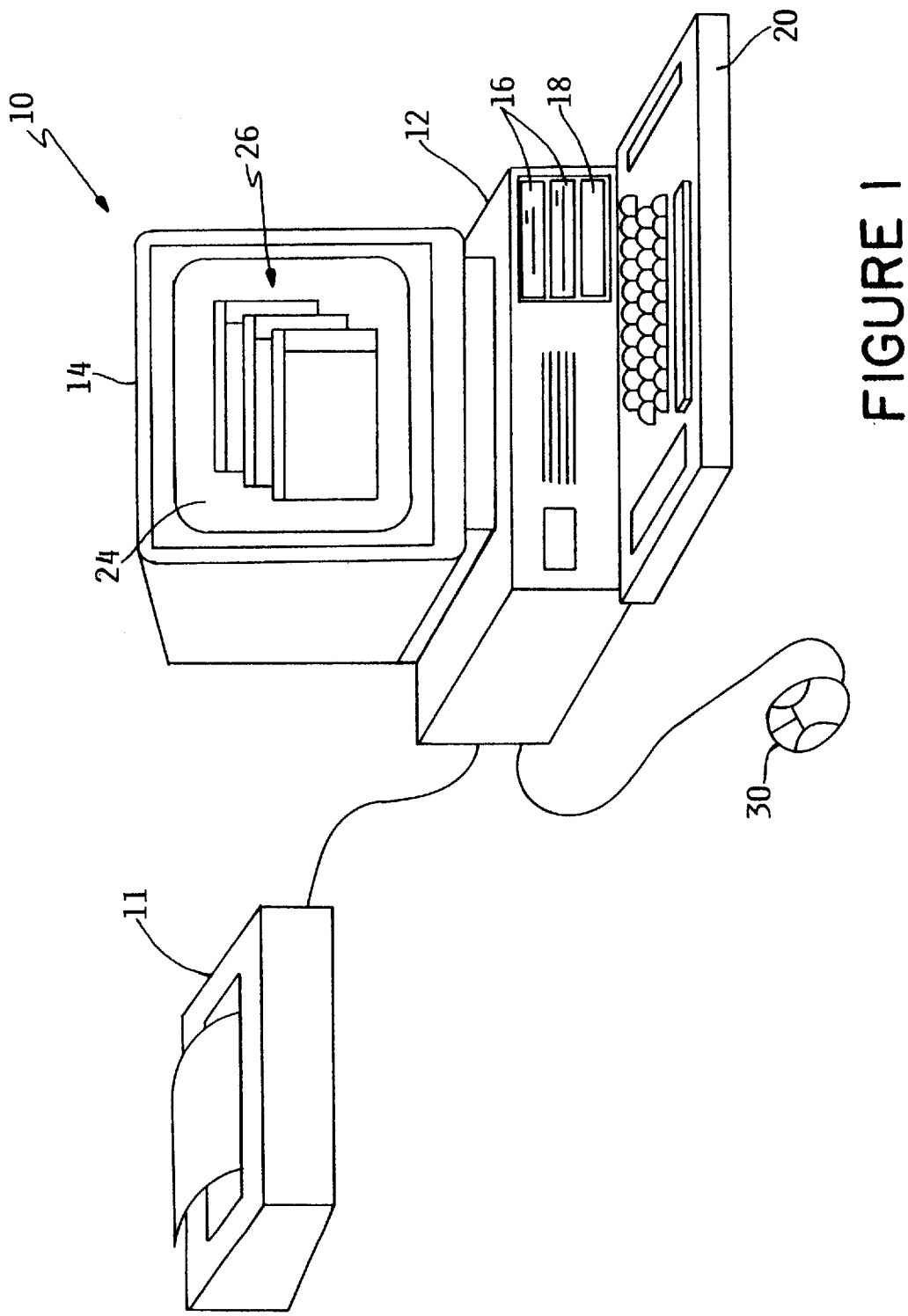
FIG. 1 illustrates the computer environment of the present invention.

FIG. 1 illustrates a computer system 10 in which the present invention can be utilized. The present invention is a computer input device, e.g., a mouse 30 coupled to a computer 12, wherein the computer input device 30 has an output for communicating with the computer 12. As a mouse or trackball separate from a keyboard, for instance, the computer input device 30 comprises a shell or body designed with recesses for digits of the human hand on either side of an upwardly-sloping curvature for the other digits or fingers and the palm of a hand. The computer input device 30 also a control circuit which includes one or more sensors together and a configuration circuit to automatically determine whether the user is operating the computer input device 30 with a right hand or a left hand and then to configure the selection actuators or buttons accordingly. The present invention solves the problem of having to either manually change the handedness of the input device 30 or to make handedness changes in the system software.

Typically the computer input device 30 of the present invention is attached to a computer 12 via a serial port or a bus port. Monitor 14, hard and/or floppy disk drives 16, CD-ROM drives 18, and/or printer 11 or other peripherals, as well as other input devices, for example, a keyboard 20, are also operatively connected to the computer 12. The computer 12 operates under the control of an operating system 24, which is represented in FIG. 1 by the display on the monitor 12. The operating system 24 controls the actions of one or more application computer programs 26 executed by the computer 12. The computer input device 30 is used by the operator to operate both the operating system 24 and the application computer programs 26.

FIG. 2 is a block diagram illustrating typical components of the computer input device 30. The computer input device 30 includes an output transmitter 32 and a control circuit 34. The output transmitter 32 may be a wire connecting the computer input device 30 to the computer, a wireless transmitter or any other means of sending a signal to the computer. The control circuit 34 may include a left selection actuator 36, a middle selection actuator 38, and a right selection actuator 40. An example of a selection actuator is a button on a mouse, a button on a trackball or a button on a keyboard computer input device such as a TRACK-POINT®. The control circuit 34 also includes a first sensor 42 and a second sensor 44. Examples of such sensors are optical driver/receivers using infrared or visible light, piezo-electric transducers, touchplates, or a temperature or heat sensor.

The control circuit 34 also includes an electronic configuration circuit in conjunction with a sensor to automatically determine whether the user is operating the computer input device with a left hand or a right hand and then to configure the actuators to accommodate the handedness of the user. Configuration circuit 46 receives signals from at least one of the sensors 42 and 44 and is electrically connected to the selection actuators and to the output transmitter 32.

The control circuit 34 includes a visual indicator 48 connected to the configuration circuit 46. The visual indicator may be a light emitting diode typically located where it can be easily seen by the user. For example, the visual indicator 48 shown in FIGS. 3a–d is located on the shell 58, substantially adjacent to the left selection actuator 36. If the computer input device 30 is not properly operated by the user's hand, then the visual indicator 48 is in one state, and if the computer input device 30 is properly operated by the user, then the visual indicator 48 is in a different state, such as "on" or "off" or blinking or variation in hue. Alternatively, the visual indicator 48 could be an indication on the computer display such as an icon, a message, or other marker.

Control circuit 34 may also include an audible indicator 50 which emits an audible sound to indicate handedness or to inform the user that the computer input device 30 is not being properly operated. The audible indicator 50 might be a speaker coupled to the computer input device or coupled to the computer, and states of the sound means could be emitting sound, not emitting sound, different tones, verbal messages, etc.

The implementation of the invention in the form of a mouse 30 is shown in FIGS. 3a–d. A mouse 30 includes a shell 58 and a spherical ball (not shown) between the shell and a supporting surface on which the mouse 30 can be operated. The mouse 30 in FIGS. 3a–d includes a left selection actuator 36, a middle selection actuator 38, and a right selection actuator 40, although typically many mice have only a left selection actuator 36 and a right selection actuator 40. The invention herein is intended to cover such a computer input device, regardless of the number of selection actuators. A mouse 30 or other input device can have any number of selection actuators. The selection actuators shown in FIGS. 3a–d are activated by being depressed downward into the shell 58 of the mouse. Each selection actuator corresponds to the communication of a unique signal to the computer. For example, activation of left selection actuator 36 could send a signal to the computer to select an icon on the display and activation of right selection actuator 40 could communicate a different signal to the computer. For example, the activation of right selection actuator 40 could tell the computer to display a menu.

Figure 3A:
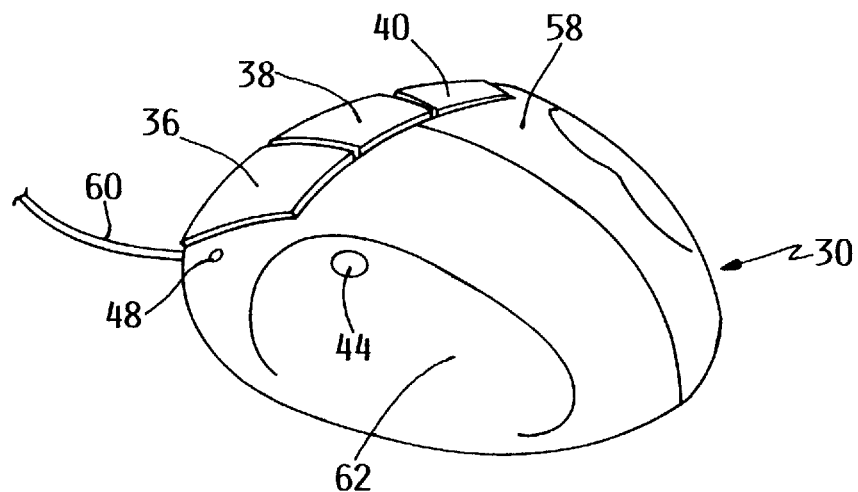
FIG. 3a is a drawing of the present system embodied in a mouse from the perspective showing a right-handed thumb location.
Figure 3B:
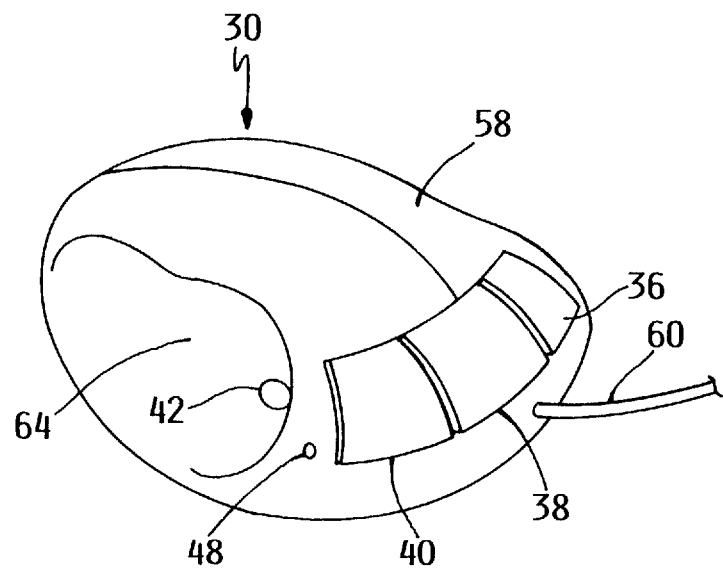
FIG. 3b is a drawing of the present system embodied in a mouse from the perspective showing a left-handed thumb location.

The mouse 30 shown in FIG. 3b also includes a wire 60, as an embodiment of output transmitter 32, connected to the computer (not shown) to relay signals from the computer input device to the computer.

The mouse 30 shown in FIGS. 3a–d also includes a first location 64 and a second location 62. The locations 62 and 64 are not limited to a particular side of the mouse or to a particular digit of a hand, although mouse 30 is preferably designed so that thumbs recesses of the first and second locations 62 and 64; any finger or appendage or even a tool used to operate the mouse or computer input device 30. For purposes of clarity only, and not to be limiting, this description will treat the "first location" as the thumb location that receives the thumb of the user's left hand, and the "second thumb location" as the location that receives the thumb of the user's right hand.

Figure 3C:
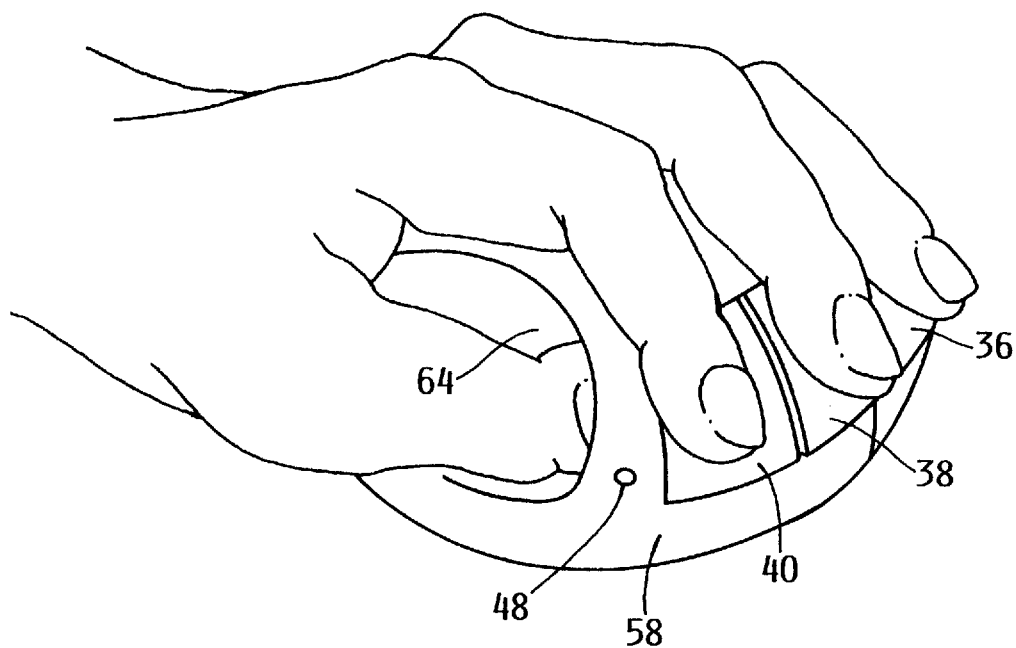
FIG. 3c is a drawing of the present system embodied in a mouse and being operated by a user's left hand.
Figure 3D:
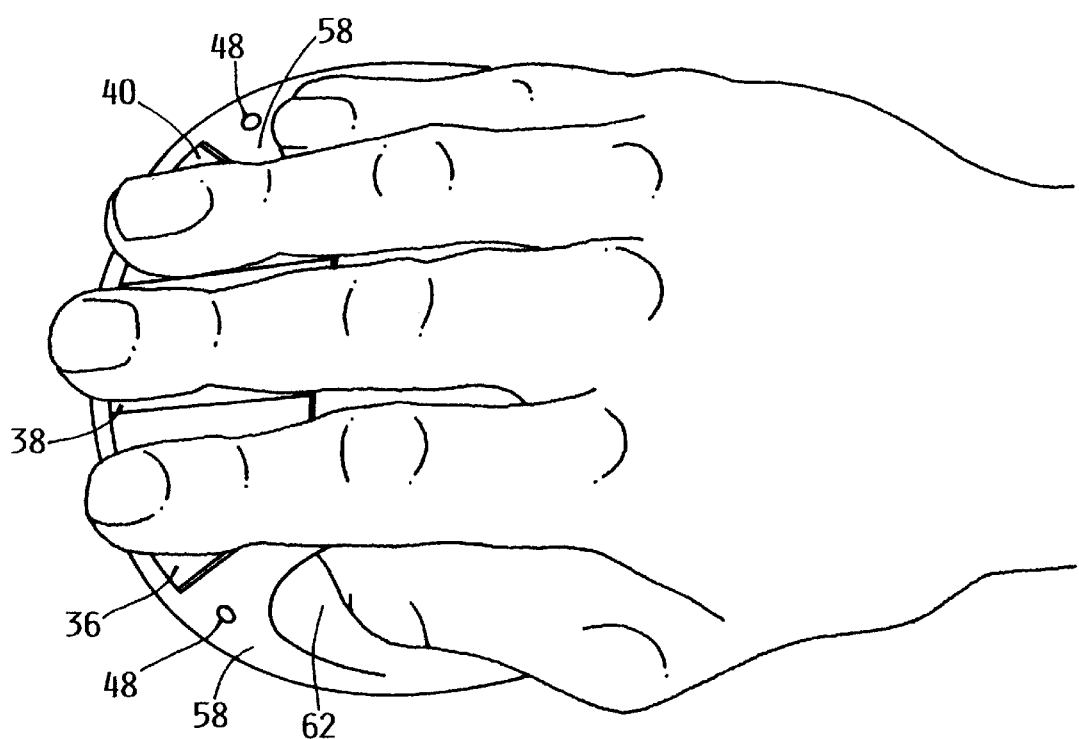
FIG. 3d is an overhead view of the present system embodied in a mouse and operated by a user's right hand.

The locations 62 and 64, as shown in FIGS. 3a–d, are concavities of the shell 58 of the mouse. FIG. 3c shows the thumb of a user's left hand fitting into the first location 64. Likewise a thumb of the user's right hand easily fits into the second thumb location 62. The mouse is ergonomically shaped such that the user's hand naturally and comfortably holds the mouse when the user's thumb is located in the appropriate thumb location. As can be seen in FIG. 3d, the first or index, the second or middle, and third or ring fingers are situated over the selection actuators 36, 38, and 40.

FIG. 3a shows a sensor 44 in the second location 62. Sensors 42 and 44 are not restricted to one type of sensor used; in one embodiment, sensors 42 and 44 are infrared sensors, although sensors sensitive to other wavelengths of radiation would function as well. When the thumb of the user's left hand is inserted into the first location 64 as illustrated in FIG. 3c, sensor 42 senses the presence of the thumb. The presence of a thumb in the first location 64 indicates that the user is operating the mouse with the left hand. The presence of a thumb in the second location 62 indicates that the user is operating the mouse with the right hand.

If neither sensor 42 nor sensor 44 sense the presence of an object such as a thumb, then the control circuit 34 deems the user to not be operating the computer input device properly. Additionally, if both sensor 42 and sensor 44 simultaneously sense the presence of an object such as a thumb or finger, then the control circuit 34 deems the user to not be operating the computer input device properly. In either case, an error signal is generated.

Figure 4A:
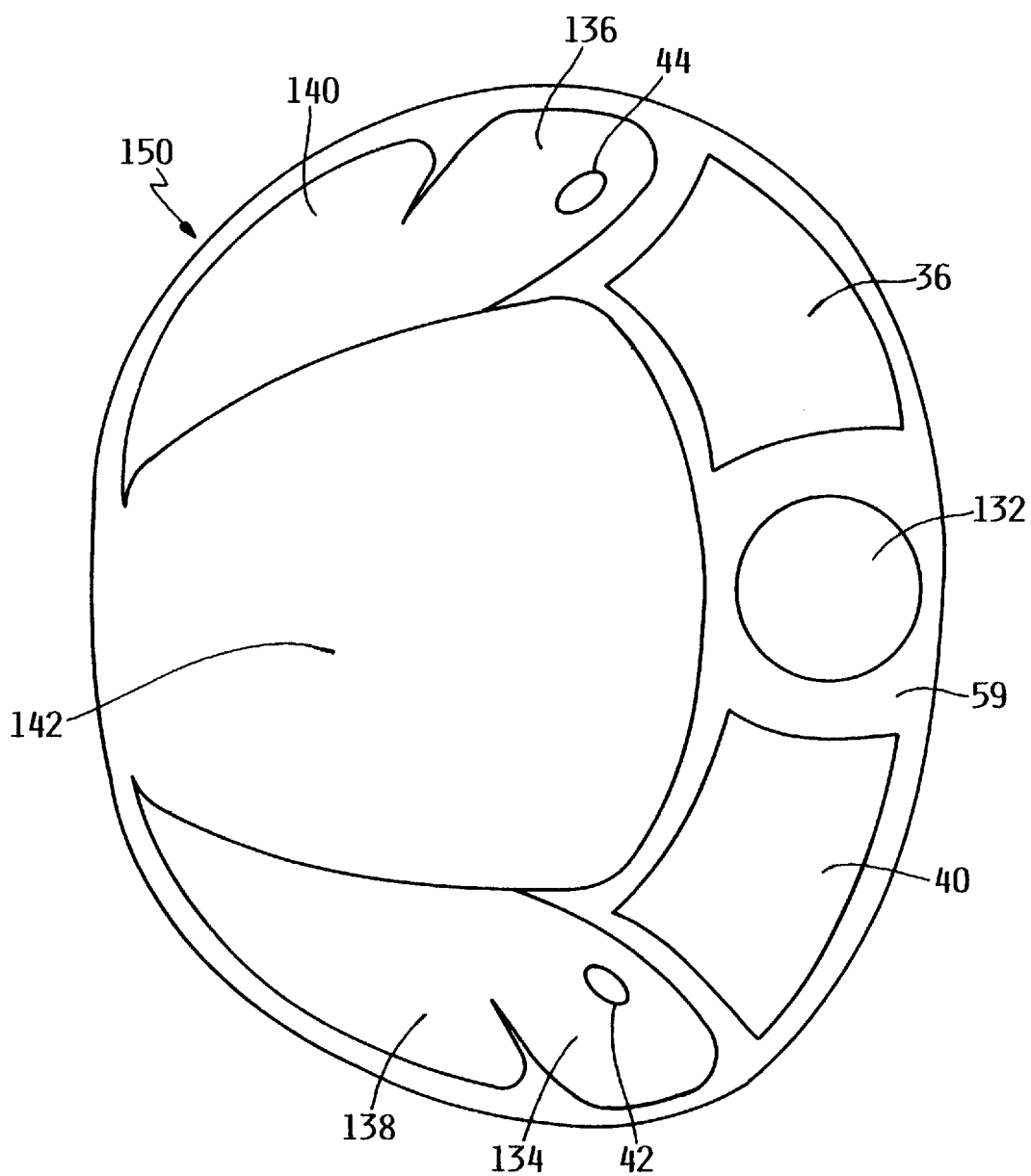
FIG. 4a is an overhead view of the present system embodied in a trackball.
Figure 4B:
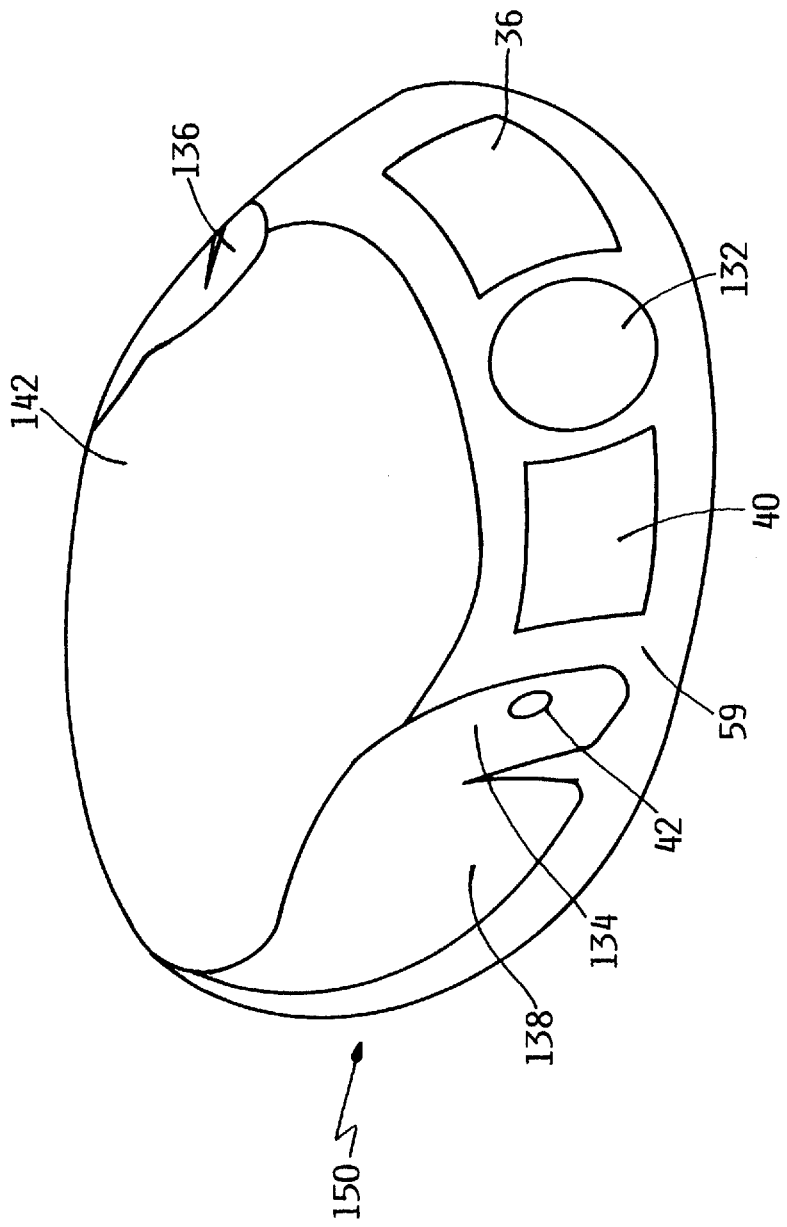
FIG. 4b is a front view of the present system embodied in a trackball.
Figure 4C:
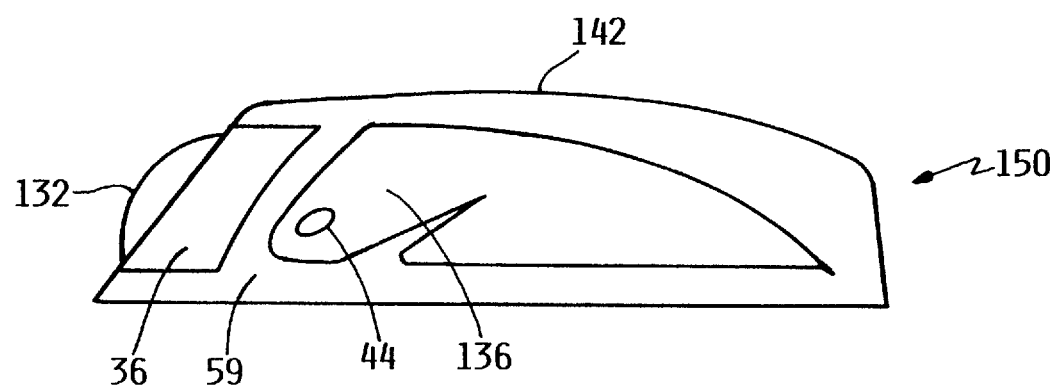
FIG. 4c is a side view of the present system embodied in a trackball.

The computer input device of this invention can also be implemented in the form of a trackball 150. FIGS. 4a–4e show the computer input device as a trackball 150. An overhead view and a front view of an embodiment of the invention in a trackball 150 is shown in FIGS. 4a and 4b respectively. The trackball 150 has a shell 59 with a ball 132 partially extending spherically out from the shell (also see FIG. 4c). Movement of the ball 132 sends a positional signal to the computer; for example, the movement of the ball 132 moves the cursor on the computer display.

The trackball 150 shown in the figures has a left selection actuator 36 and a right selection actuator 40. Note, however, that the trackball 150 could have any number of selection actuators. The trackball 150 has a right sensor 42 located in location 134 which might be a location for the right third finger, and the device has a left sensor 44 located in location 136 which might accommodate the left third finger. Note that the designation of the right and left sensors to any particular side of the trackball is for example only. Locations 134 and 136 are concavities of the shell 59 to accommodate various fingers. Adjacent to location 134 is location 138 which might accommodate the right fourth or smallest finger. Adjacent to location 136 is yet another hollow location 140 which might accommodate the left fourth or smallest finger. Pad 142 is that portion of this embodiment upon which the palm of the hand rests while operating the trackball. FIG. 4b shows a front view of the features mentioned above.

Figure 4D:
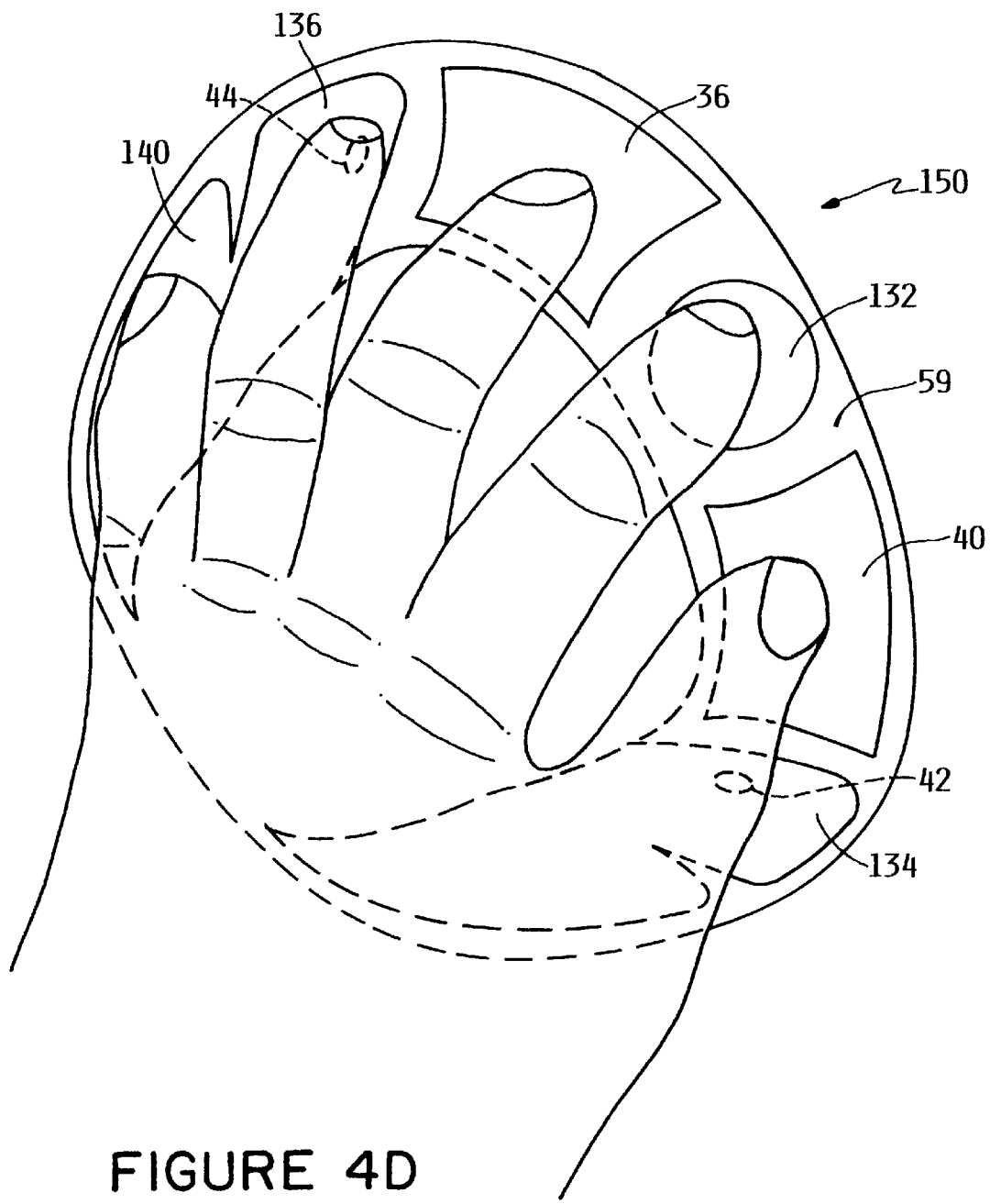
FIG. 4d is an overhead view of the present system embodied in a trackball being operated by a user's left hand.

FIG. 4d illustrates an embodiment of the trackball 150 being operated by the user's left hand. The user's first or index finger is used to rotate the ball 132. The user's thumb is used to activate the right selection actuator 40, and the second or middle finger is used to activate the left selection actuator 36. The user's third finger fits easily and naturally into location 136, thereby activating the left sensor 44. Note that the user's fourth or smallest finger is placed in location 140. The locations 138 and 140 illustrated herein do not contain sensors. However, a sensor in one or both locations 138 and 140 is certainly within the coverage of the appended claims.

Figure 4E:
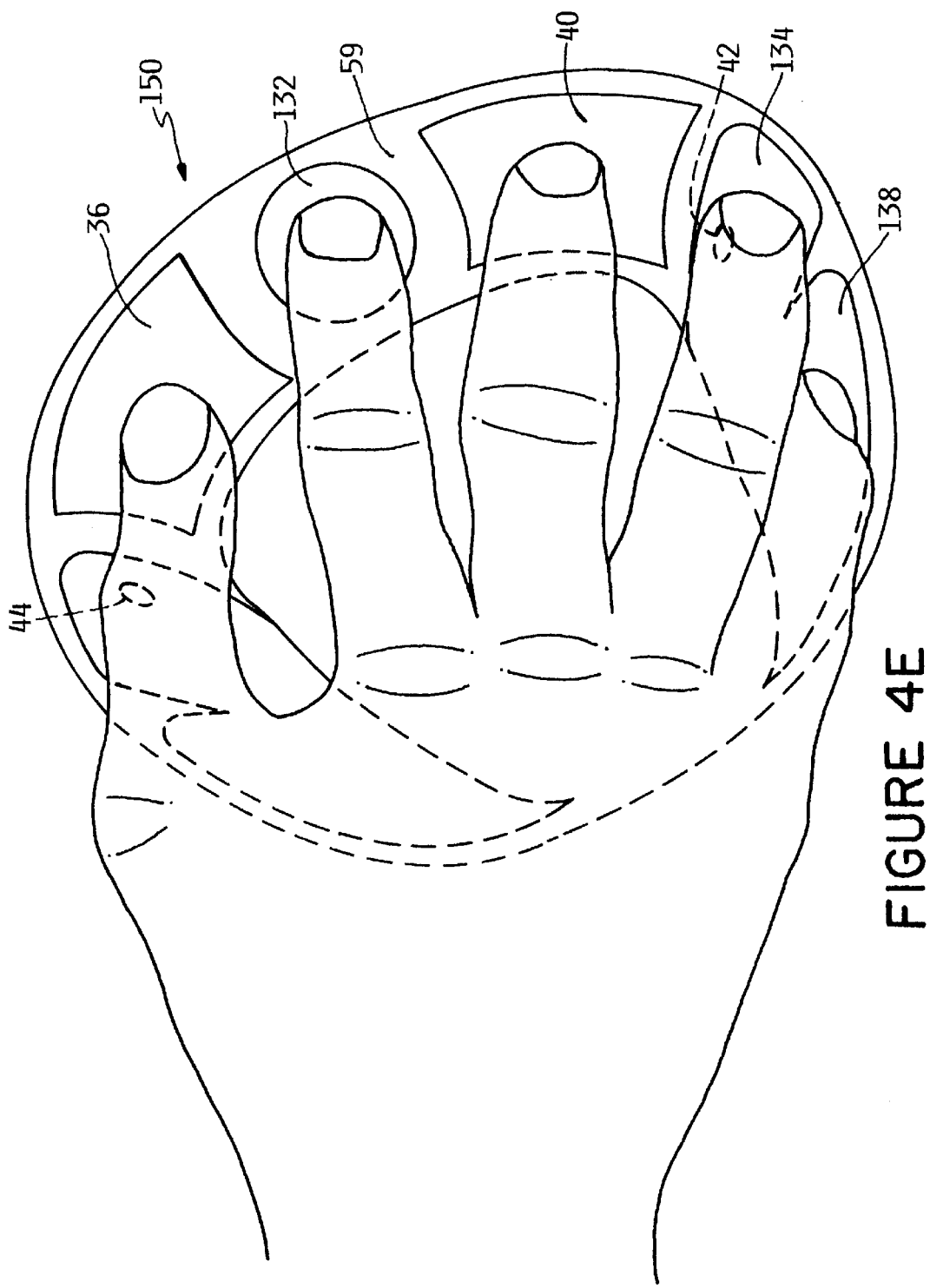
FIG. 4e is an overhead view of the present system embodied in a trackball being operated by a user's right hand.

FIG. 4e illustrates an embodiment of the trackball 150 being operated by the user's right hand. When operated with the right hand, the user's first or index finger operates the ball 132, the thumb activates the left selection actuator 36, and the second or middle finger activates the right selection actuator 40. The user's third finger is placed in location 134 where it activates the right sensor 42. The fourth or smallest finger of the user's right-hand is positioned in location 138.

It is typically desired that the thumb be used to activate the primary function and the second or middle finger to activate the secondary function. If the right sensor 42 is activated, then the user is operating the trackball 150 with the right hand and the right selection actuator 40 corresponds with the secondary function and the left selection actuator 36 corresponds with the primary function. If the left sensor 44 is activated, then the user is operating the trackball 150 with the left hand and the left selection actuator 36 corresponds with the secondary function and the right selection actuator 40 corresponds with the primary function. The trackball 150, therefore, operates in the same way as the mouse, as described above, and can utilize the same control circuitry, as described later in this description.

Figure 5A:
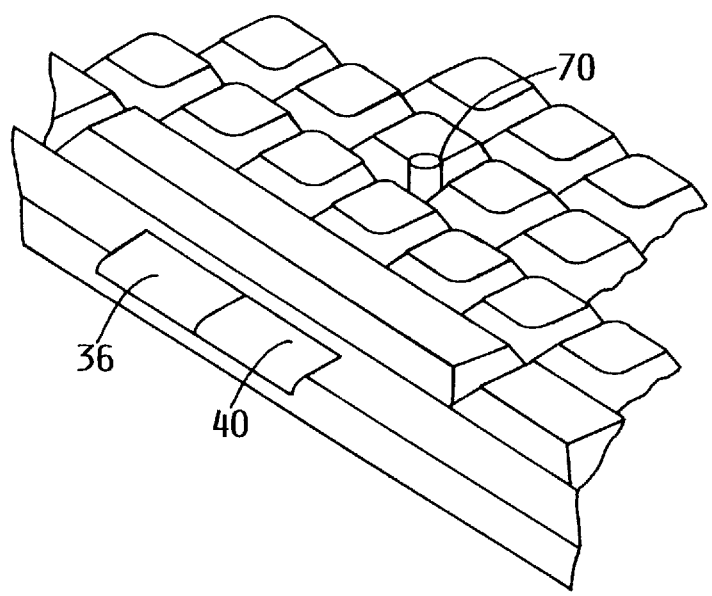
FIG. 5a is a drawing of the computer input device embodied as extension from the keyboard without the present invention shown.
Figure 5B:
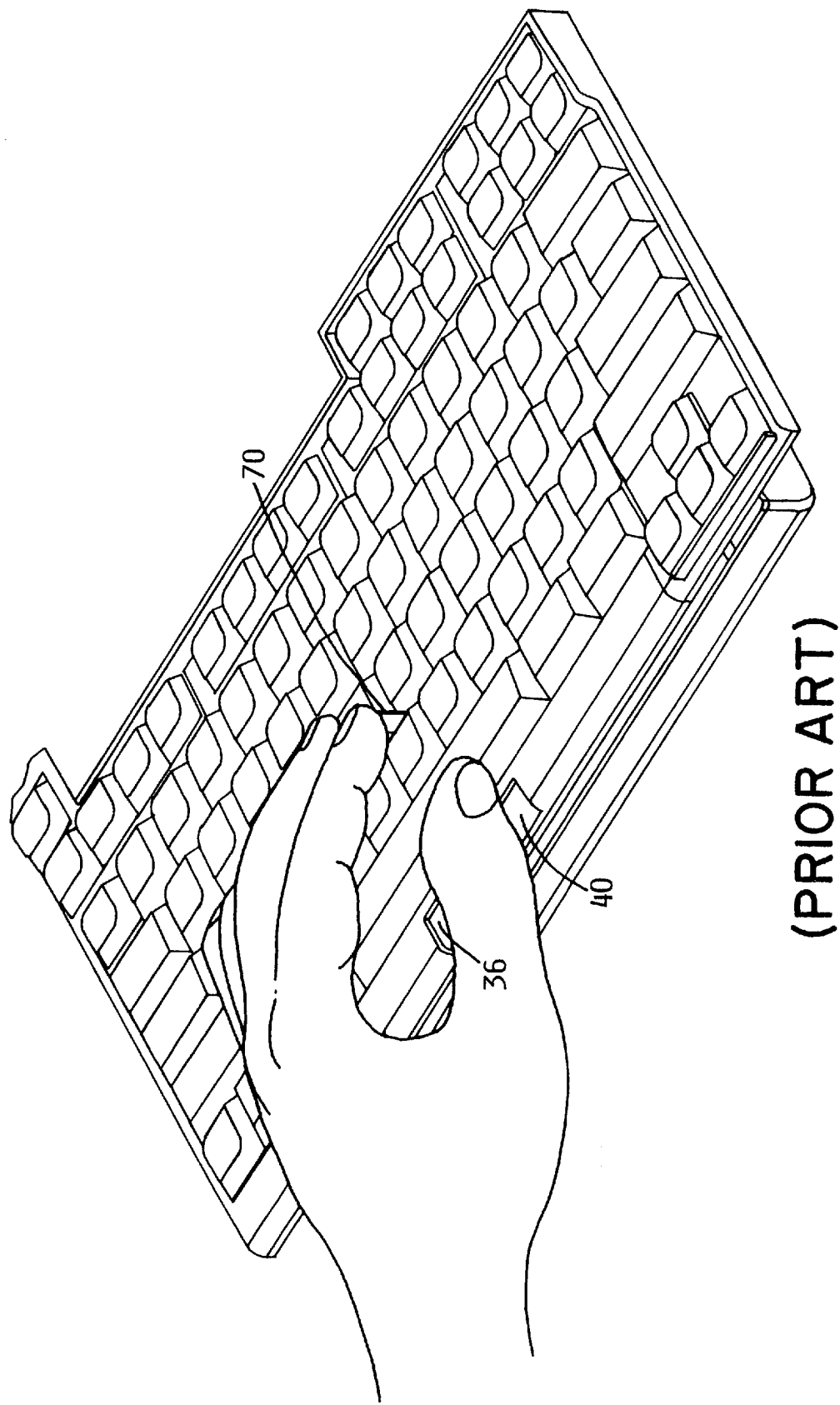

The computer input device of this invention can be implemented in a keyboard, an example of which is a TRACKPOINT®. FIG. 5a shows a portion of a keyboard including such a device without the present invention. In the TRACKPOINT®, a cylindrically-shaped rod 70 is attached to the keyboard above the "B" key and between the "G" and "H" keys on the QWERTY layout of a keyboard. With these devices incorporated into a keyboard, the user manipulates the indicator or cursor on the computer display by applying pressure to the rod 70. For example, to move the cursor on the display, the user pushes the rod 70 away from the "B" key. The user typically manipulates the rod 70 with the index finger of the right hand or the index finger of the left hand. The computer input device shown in FIG. 5a also includes a right selection actuator 40 and a left selection actuator 36. These selection actuators perform the same function as selection actuators in other types of computer input devices. FIG. 5b shows a keyboard computer input device being operated with a user's left hand. The index finger of the user's left hand is manipulating the rod 70. The thumb of the user's left hand is on top of the right selection actuator 40. If the user operates the keyboard computer input device with a right hand, then the thumb of the right hand would be situated on top of the left selection actuator 36. Therefore, for a left-handed user of the rod 70, the right selection actuator 40 should correspond with the primary function, and the left selection actuator 36 should correspond with the secondary function. The opposite is true for a right-handed user of the rod 70.

FIG. 5c illustrates one embodiment of the present invention in a keyboard computer input device. The letters "G", "H", "V" represent the keys on a standard QWERTY keyboard. The rod 70 is fixed to the keyboard above the "B" key and between the "G" and "H" key. The "X" in FIG. 5c represents a driver in an optical driver receiver pair, and the "O" represents a receiver. However, the illustration of an optical driver receiver pair is not meant to limit this invention. The first sensor 42 and the second sensor 44 could be any sensor known by one skilled in the art which could sense the presence of a thumb or finger, such as a heat detector to detect body heat or other temperature greater than ambient temperature.

Figure 5D:
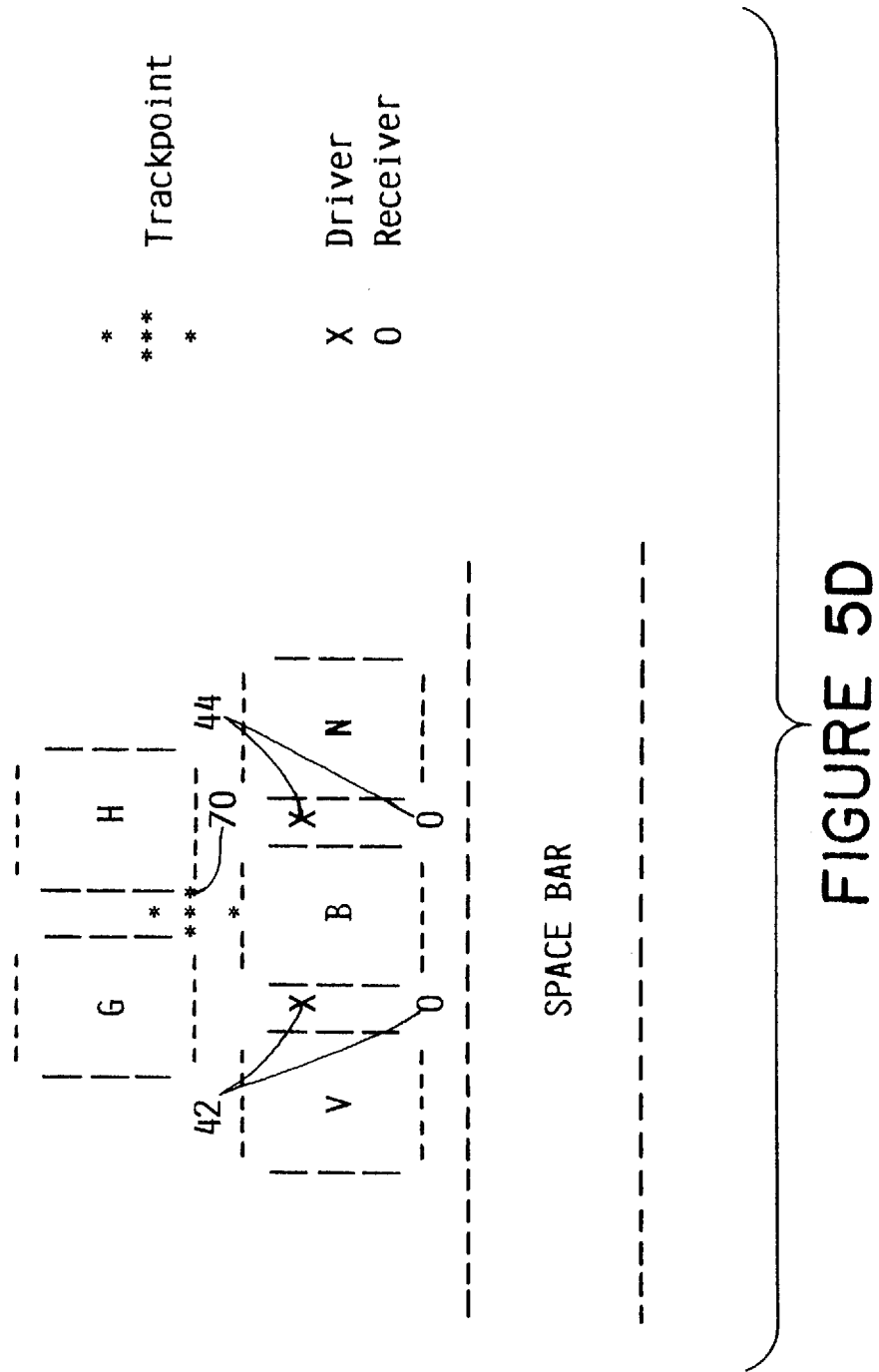
FIG. 5d is a drawing of the present system embodied in a computer input device of FIG. 5c with an alternate placement of the sensors.
Figure 5E:
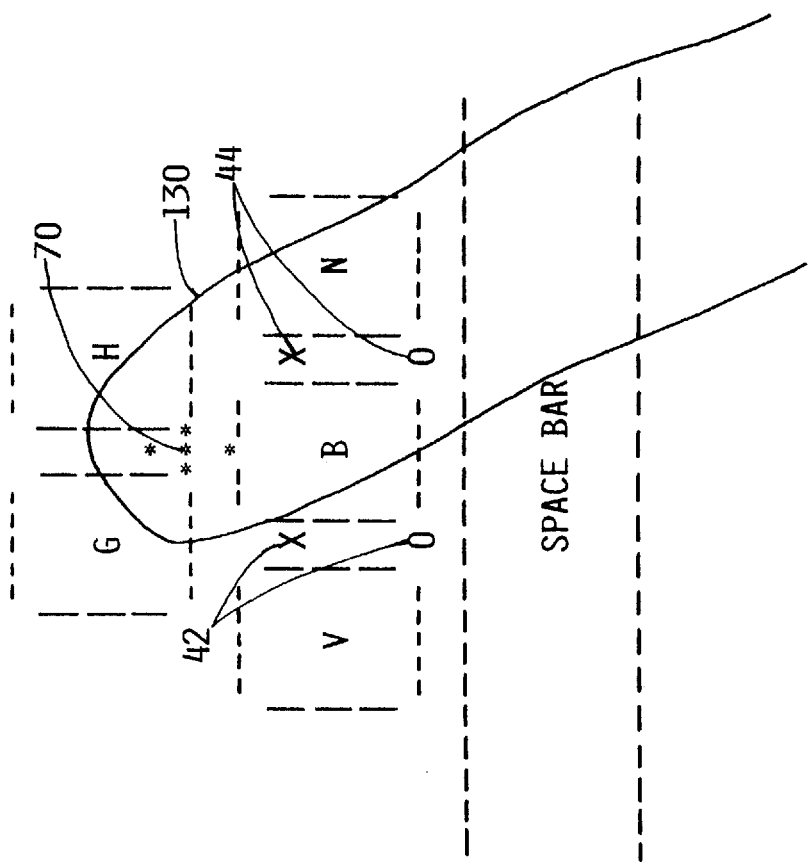
FIG. 5e is a drawing of a computer input device embodiment of the extending rod/stick with the outline of a user's right hand index finger shown manipulating the rod.

FIG. 5d illustrates an alternate position for the driver and receiver of the first sensor 42 and the second sensor 44. FIG. 5e demonstrates how manipulation of the rod 70 with the index finger 130 of the user's right hand covers the second sensor 44 but not the first sensor 42. Likewise, if the user manipulates the rod 70 with the index finger of the left hand, then the first sensor 42 is covered but second sensor 44 is not covered.

Figure 6A:
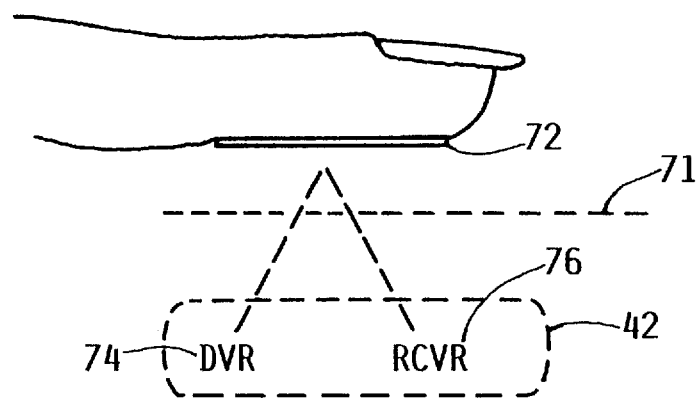
FIG. 6a is a drawing of a driver/receiver and the return of a beam to the receiver when a thumb or other object is above the driver/receiver.
Figure 6B:
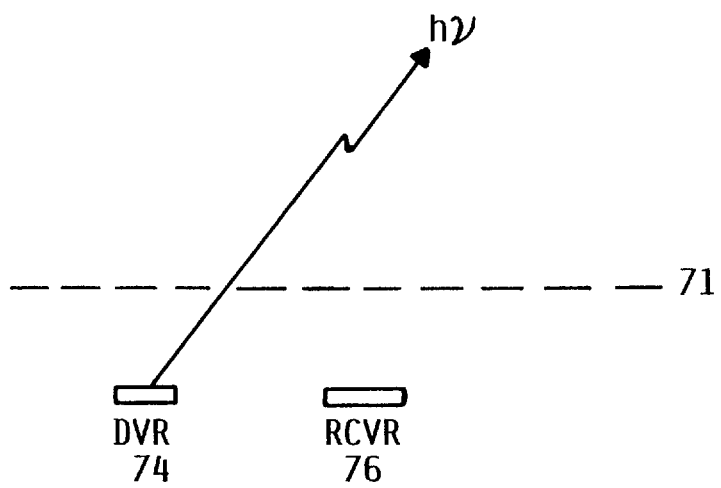
FIG. 6b is a drawing of a driver/receiver and the reflection of the infrared beam when a thumb or other object is not above the driver/receiver pair.

FIGS. 6a and 6b show how the covering of an optical driver/receiver, by an index finger, results in detection or sensing of the finger. In FIG. 6a, the user's finger surface 72 is substantially directly above the driver 74 and the receiver 76 of the first sensor 42. Again, the concept here is that the user is manipulating the TRACKPOINT® or similar apparatus with some extension whether it be a finger or other appendage or an object. The dotted line 71 merely indicates the plane of upper surface of the keys when a key is depressed. A lens (not shown) might be inserted at this depth to facilitate the invention. The driver 74 emits an infrared beam which reflects off the thumb or finger surface 72 to the receiver 76. If the thumb or finger surface is not above the driver 74 and receiver 76, as shown in FIG. 6b, then the infrared beam will not directly reflect back to the receiver 76 and the sensor is not activated.

Figure 7:
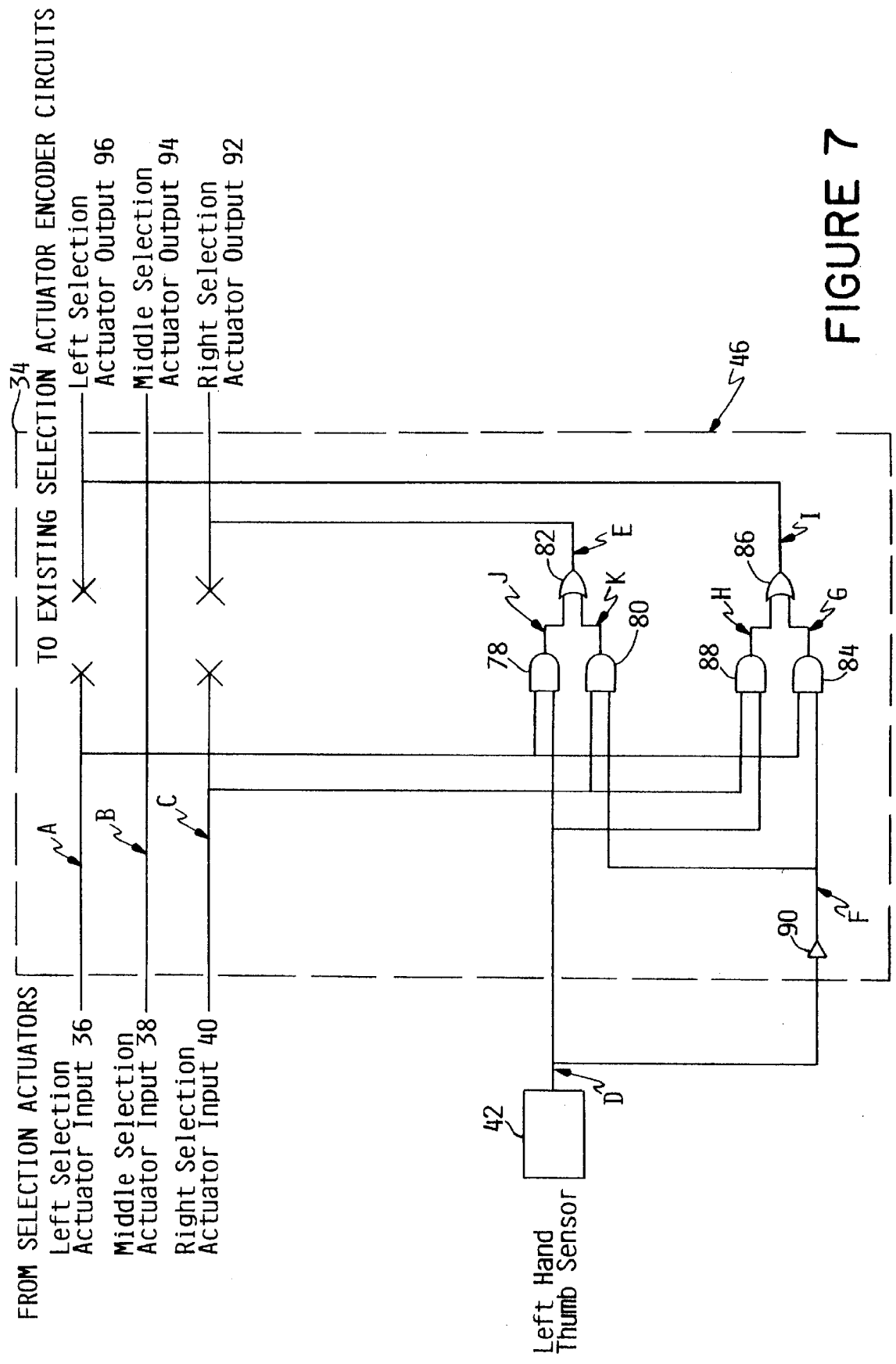
FIG. 7 is a schematic diagram of an embodiment of the control circuit of this invention with one sensor.
Figure 8:
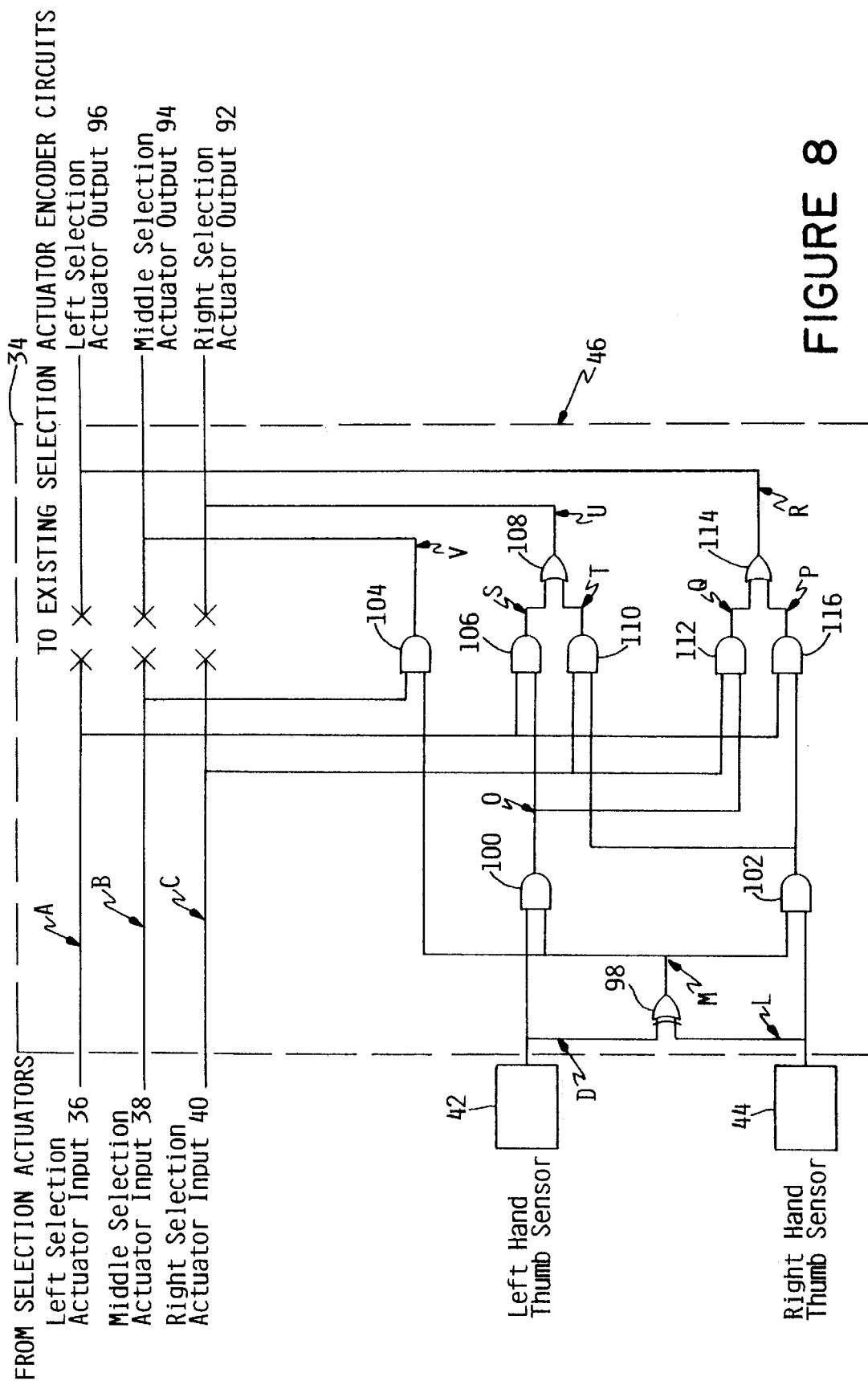
FIG. 8 is a schematic diagram of an embodiment of the control circuit of this invention with two sensors.
Figure 9:
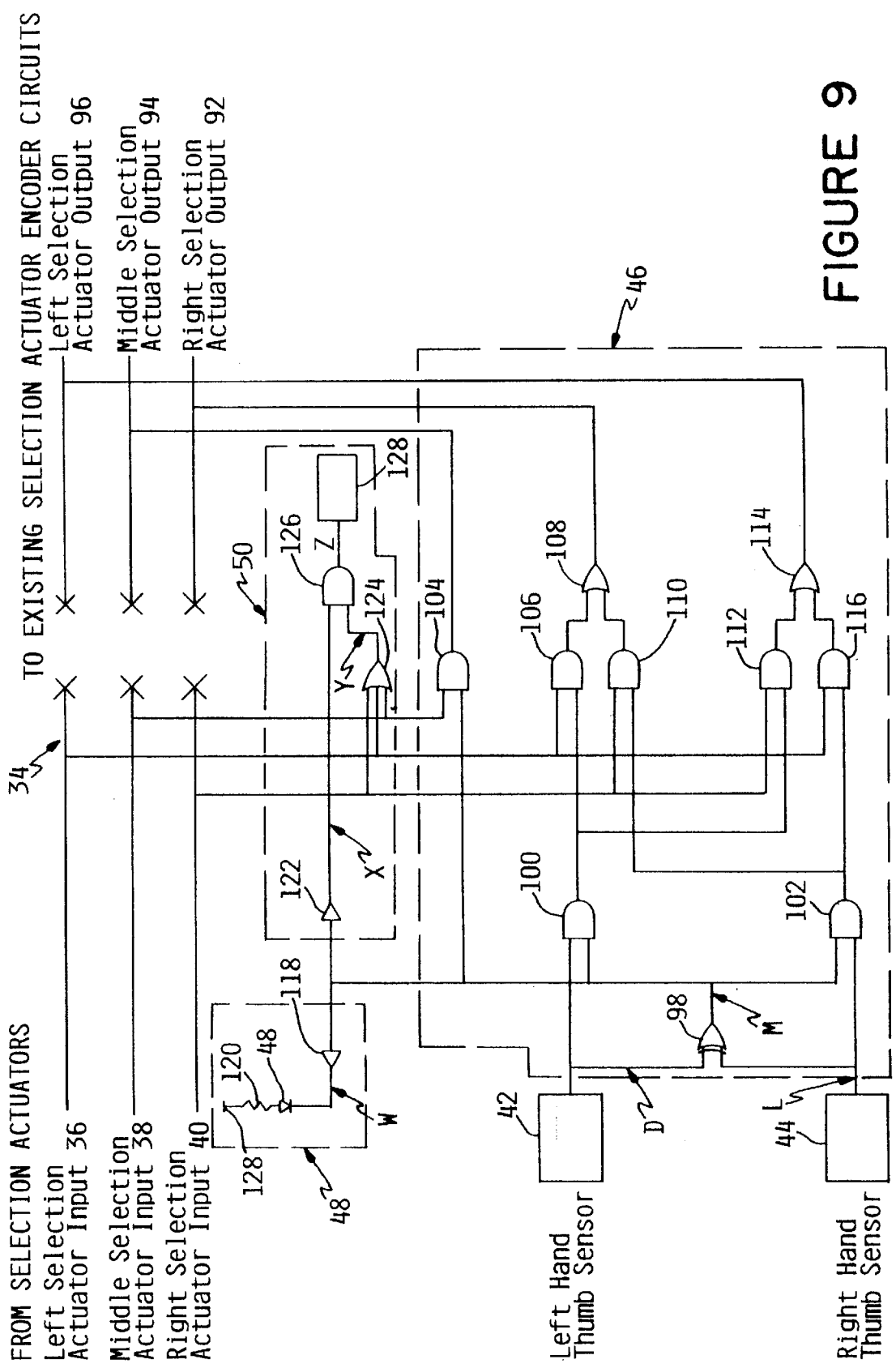
FIG. 9 is a schematic diagram of yet another embodiment of the control circuit of this invention with two sensors and circuitry to generate handedness and error signals.

A variety of control circuits used with the present system are shown in FIGS. 7–9. Control circuits of the present invention comprise not only at least one sensor, such as sensor 42, but also a configuration circuit 46 for automatically determining handedness, i.e., whether the user is operating the computer input device with a left hand or a right hand, either by directly sensing an object, such as a thumb or finger, or the absence of the object. The key feature of the control circuit is that the computer input device determines handedness independent of the computer and/or its software. The control circuit further configures the primary and secondary functions of the selection actuators for a particular handedness.

FIG. 7 is a schematic diagram of one embodiment of the control circuit 34 of this invention which, given the output of a single sensor, will configure the selection actuators to primary and secondary functions. The control circuit comprises a first sensor 42 and the configuration circuit 46. The configuration circuit 46 further comprises AND gates 78, 80, 84 and 88; OR gates 82 and 86; and an invertor 90. The left selection actuator input 36, middle selection actuator input 38, and right selection actuator input 40 are the same as the left selection actuator output 96, middle selection actuator output 94 and the right selection actuator output 92 respectively. The configuration circuit 46 may alter these connections depending upon whether the sensor 42 is activated.

If the thumb of the user's left hand is located in the first location 64 shown in FIG. 3c, signal D is high. If the user then activates the left selection actuator 36, then signal A is high. This means that both inputs to AND gate 78 are high and, therefore, signal J is high. Since at least one of the inputs to OR gate 82 is high, the output, signal E, is also high. Signal E is the same as the right selection actuator output 92. Therefore signal A, which was high on the left selection actuator 36, has now become a high signal E on the right selection actuator output 92. Therefore, the activation of the sensor 42 by an object causes the configuration circuit 46 to determine that the mouse is a left-handed mouse and that the right selection actuator 40 is to be associated with a primary function and the left selection actuator 36 is to be associated with a secondary function.

If the right selection actuator 40 is activated while there is a thumb in the first location 64 (see FIG. 3c), e.g., a user is operating the computer input device with his/her left-hand, then signals C and D are high. Signals C and D are the two inputs to the AND gate 88 and, therefore, the output of AND gate 88, signal H is high. The result is that signal I, which is the same as left selection actuator output 96, is high. A high signal on the right selection actuator 40 thus yields a high on the left selection actuator output 96. When there is no sensor or when the left-handed thumb sensor 42 is not activated, the invention determines that the mouse is a right-handed mouse and that the left selection actuator 36 is associated with a primary function and the right selection actuator 40 is associated with a secondary function. Note that the signal B on the middle selection actuator input 38 is the same as the middle selection actuator output 94. The middle selection actuator output 94 is not affected by the state of the left-handed thumb sensor 42.

In the embodiment shown in FIG. 7, if the user is operating the mouse with the right hand, then there is no thumb or finger in the first location 64 and signal D in FIG. 7 is low. If the user then activates the left selection actuator, then signal A is high. The two inputs to AND gate 84, signal A and signal F, the inverse of signal D, are both high. Therefore, signal G and I will be high. In summary, if the user is operating the mouse with the right-hand and the left selection actuator 36 is activated, then the configuration circuit 46 leaves the operation of the selection actuators unchanged such that the high signal of the left selection actuator 36 becomes a high signal of left selection actuator output 96.

If the user operates the mouse with the right hand and activates the right selection actuator 40, then signal C is high and signal D is low. Then the two inputs to AND gate 80 are high and thereby signals K and E are high. Therefore, the high signal C from the right selection actuator 40 becomes the high signal on right selection actuator output 92. In summary, if the user is operating the mouse with the right hand and the right selection actuator 40 is activated, then the control circuit leaves the operation of the selection actuators unchanged such that the high signal of the right selection actuator 40 becomes a high signal of right selection actuator output 92.

The schematic diagram in FIG. 8 is an embodiment of the control circuit with a first sensor 42, a second sensor 44, and a configuration circuit 46. The invention, in this embodiment of FIG. 8, directly detects a thumb or finger, by first sensor 42 or second sensor 44, and once that thumb or finger is sensed by a particular sensor, the configuration circuit 46 operates to configure the selection actuators. So, for purposes of discussion only, first sensor 42 will be referred to as the left-handed thumb sensor 42, and the second sensor 44 will be referred to as the right-handed thumb sensor 44, but the terms "first sensor" and "second sensor" in the claims is not limited to a particular side of the computer input device.

Four possibilities with respect to the right-handed thumb sensor 44 and the left-handed thumb sensor 42 exist: (1) only the left-handed thumb sensor 42 is activated; (2) only the right-handed thumb sensor 44 is activated; (3) both the left- and right-handed thumb sensors 42, 44 are activated; or (4) neither the left- nor right-handed thumb sensor 42, 44 is activated.

Starting with the first scenario, when only the left-handed thumb sensor 42 is activated, the signal D is high and the signal L is low. If only the left selection actuator 36 is activated, the signal A is high. Because only one of signals D and L are high, the output of the exclusive OR gate 98, signal M, is high. Signal M and signal D, both high, are fed into AND gate 100, resulting in a high signal O. The high signal O and the high signal A are input into the AND gate 106, resulting in a high signal S and, therefore, a high signal U. The end result is that, when the operator is operating the mouse with the left hand and the left selection actuator is activated, then the high signal A from the left selection actuator 36 becomes the high signal U, which is the same as the right selection actuator output 92.

If the right selection actuator 40 is activated in conjunction with activation of the left-handed thumb sensor 42, then signal C is high.

Signal O and signal C, which are both high, are input into AND gate 112.

Therefore, signal Q is high, as is signal R. Accordingly, the high signal C from the activation of the right selection actuator 40 results in a high signal R which is the left selection actuator output 96. Therefore, when the computer input device 30 is operated with a left hand, the configuration circuit 46 switches the operation of the left and right selection actuators so that they are optimized to operate with the user's left hand.

With regard to the middle selection actuator 38, signal M, which is high, is input to AND gate 104 along with signal B. The resulting signal V, therefore, tracks signal B. Activation of the middle selection actuator 38, therefore, creates a high signal V, which is the middle selection actuator output 94. Note, however, that if the mouse is not operated properly, i.e., neither the left-handed thumb sensor 42 nor the right-handed thumb sensor 44 are activated or both are activated at the same time, then the signal M is low, and activation of any selection actuators results in no outputs (92, 94 or 96).

The same circuit analysis applies when the user operates the mouse with a right hand. In such a case, signal A of the left selection actuator 36 becomes signal R, which is the left selection actuator output 96. Signal C of the right selection actuator 40 becomes signal U, which is the right selection actuator output 92. Lastly, signal B of the middle selection actuator 38 becomes signal V, which is the middle selection actuator output 94. In summary, when the computer input device 30 is operated with a right hand, the control circuit leaves the operation of the selection actuators 36, 38 and 40 unchanged so as to continue operating with the right hand.

If the left-handed thumb sensor 42 and the right-handed thumb sensor 44 are both activated, then the circuit shown schematically in FIG. 8 behaves as follows: signals D and L, which are both low, feed into the exclusive OR gate 98. Therefore, the output of the exclusive OR gate 98, signal M, is low. Signal M is input into AND gates 100, 102, and 104. Therefore, signals N, O and V, the outputs of these AND gates, are all low. Because the signals N and O feed into all of the remaining AND gates 106, 110, 112, 116, the signals U and R are also low. The result is that the left selection actuator output 96, the middle selection actuator output 94, and the right selection actuator output 92 are all low. In general terms, if both thumb sensors are sensing a thumb or finger, then the control circuit prevents the signals from the selection actuators from being transmitted to the computer.

Last is the fourth scenario in which neither the left-handed thumb sensor 42 nor the right-handed thumb sensor 44 sense a thumb or a finger. Again, because signals D and L are input into the exclusive OR gate 98, signal M is low. Therefore, the result is the same as in the case of activation of both sensors, i.e., the left, middle and right selection actuator outputs 96, 94 and 92 are low regardless of whether the selection actuators are activated.

Another embodiment of the control circuit is shown schematically in FIG. 9. This embodiment is the same as the embodiment shown in FIG. 8 but with the addition of circuitry to the control circuit to support the light emitting diode or other visual indicator 48 and the sound means 50. If only one of the left-handed thumb sensor 42 and the right-handed thumb sensor 44 are activated, then the mouse is being operated properly, and the exclusive OR gate 98 has output signal M which is high. Signal M is input to inverter 118 such that signal W is low. The output of inverter 118 is connected to the light emitting diode 48. The opposite end of light emitting diode 48 is connected to resistor 120, which in turn is connected to voltage source 128. Because signal W is low, current flows from the voltage source 128 through the resistor 120 and to the visual indicator 48. Alternatively, a signal could be output to the computer to be interactive with software and either an icon or other visual message could appear on the display to indicate handedness.

If the mouse is not operated properly, then the visual indicator 48 is not lit. Note, however, that the circuit can be configured so that if the visual indicator or light emitting diode is lit, it means that the mouse is not being properly operated. In such a case, the left-handed thumb sensor 42 and the right-handed thumb sensor 44 are both activated or neither is activated, and the output of the exclusive OR gate 98, signal M, is low. The result is that signal W is high and no signal is output to the visual indicator 48.

The operation of the preferred embodiment of the sound means 50 will now be explained. If the computer input device is not being properly operated, then signal M is low. Signal M feeds into inverter 122 and the output is signal X. Signal X is one of two inputs to AND gate 126. The other input to AND gate 126 is the output of OR gate 124. The three inputs to OR gate 124 are signals A, B and C from the three selection actuators. If any selection actuator is activated, then the output of OR gate 124, signal Y is high. If signal Y and X are both high, then the output of AND gate 126 is high, and the sound generator 128 changes state. In other words, if the mouse is not properly operated and one or more of the selection actuators is activated, then the sound generator will change state. Again, the sound generator 128 can be either incorporated into the mouse or keyboard unit, or the signal can be output to the computer to interact with the software and emit tones or audible messages indicating handedness or that an error condition exists.

Figure 10:
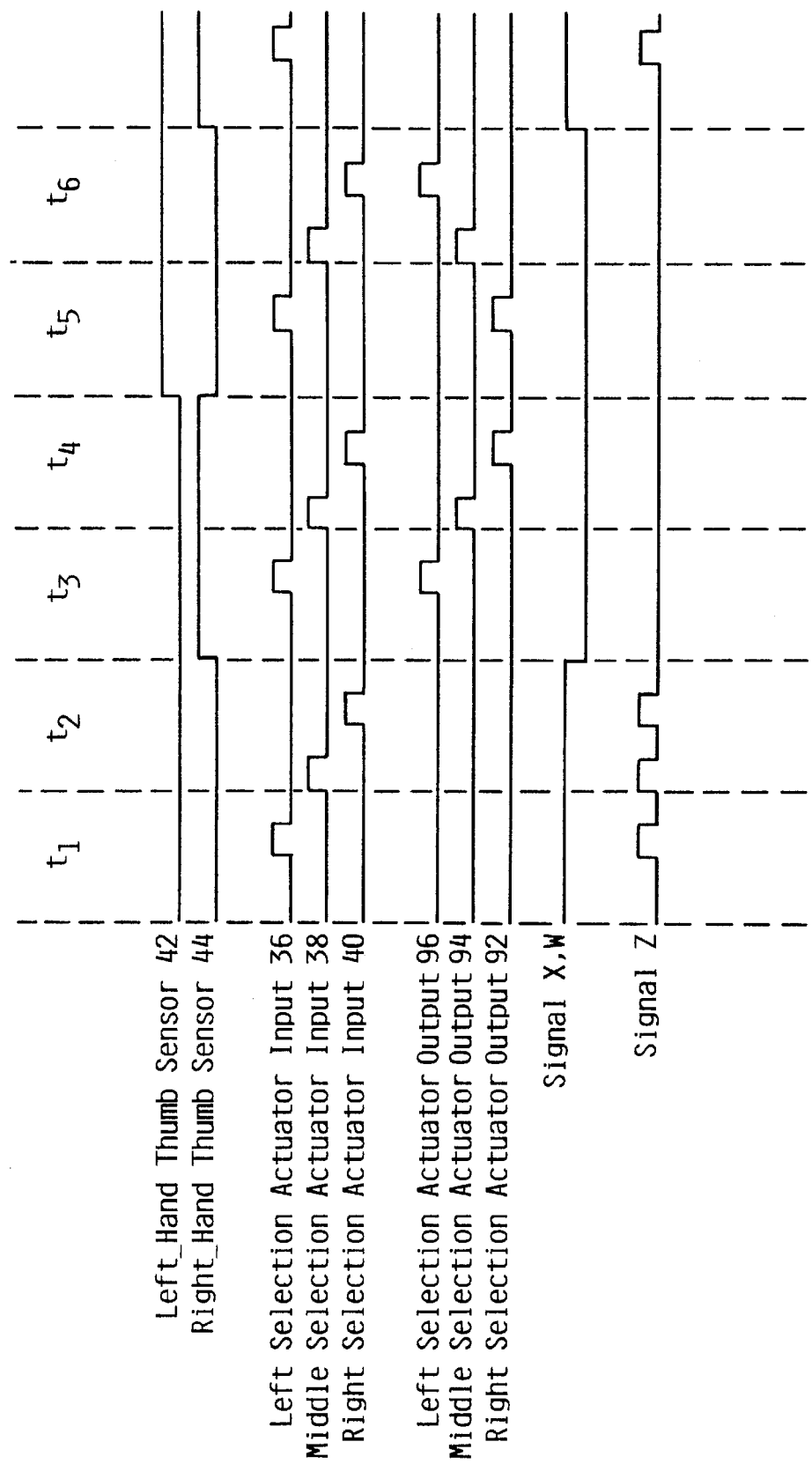
FIG. 10 is a timing diagram showing the logic level of various signals in a typical control circuit at various time periods.

FIG. 10 is a timing diagram for the circuit shown in FIG. 9. Note that signal Z is the input to the sound generator 128. In the preferred embodiment, a high on signal Z activates the sound generator 128. Also note that, when the computer input device 30 is being held properly, the signal X and signal W are both low.

In time t1 and t2, neither the left-handed thumb sensor 42 nor the right-handed thumb sensor 44 are activated. The square wave in t1 on the left selection actuator 36, the square wave in t2 on the middle selection actuator 38, and the square wave in t2 on the right selection actuator 40 cause the sound generator 128 to change state. This can be seen by the three square waves on signal Z during t1 and t2.

During t3 and t4, the right-handed thumb sensor 44 is activated and the left-handed thumb sensor 42 is not activated. In other words, the user is using the right hand to operate the computer input device 30. The result is that the control circuit does not switch the operation of the selection actuators. Left selection actuator 36 is activated during t3, and the result is a corresponding high signal on the left selection actuator output 96. Moreover, in t4, the middle selection actuator 38 and the right selection actuator 40 are activated at different times. The result is a high signal on the middle selection actuator output 94 during the activation of the middle selection actuator 38, and a high signal on the right selection actuator output 92 during the activation of the right selection actuator 40.

During t5 and t6, the user is operating the computer input device 30 with her/his left hand. The result is that the control circuit switches the operation of the left selection actuator input 36 with the right selection actuator output 96, and the signal from the right selection actuator input 40 becomes the left selection actuator output 96. The control circuit leaves the operation of the middle selection actuator input 38 unchanged to be the same as middle selection actuator output 94. This result can be seen in FIG. 10. When the left selection actuator 36 is activated in t5, there is a high signal on the right selection actuator output 92. When the right selection actuator 40 is activated in t6, there is a high signal on the left selection actuator output 96. Lastly, when the middle selection actuator 38 is activated in t6, there is a high signal on the middle selection actuator output 94.

While the present invention has been described in connection with the preferred embodiment thereof, it will be understood that many modifications will be readily apparent to those of ordinary skill in the art, and this application is intended to cover any adaptations or variations thereof. Therefore, it is manifestly intended that this invention be limited only by the claims and the equivalents thereof. For example, the control circuit could be implemented with different circuitry or in software.

What is claimed is:

1. A computer input device comprising:
   an output transmitter for communicating with a computer; and
   a control circuit coupled to the output transmitter, the control circuit comprising:
   at least a first sensor; and
   a configuration circuit coupled to the first sensor to automatically determine the handedness of the computer input device independent of motion of any component of the computer input device, wherein the configuration circuit causes the computer input device to be in a first-handed mode when the first sensor is activated, and causes the computer input device to be in a second-handed mode when the first sensor is not activated.

2. The computer input device according to claim 1 further comprising a signal generator which generates one of the following signals: a first signal indicating the handedness of the computer input device and an error signal indicating that the computer input device has no-handedness.

3. The computer input device according to claim 1 wherein the computer input device is selected from a group comprising a mouse, a trackball, and a keyboard computer input device.

4. The computer input device according to claim 3 wherein the control circuit further comprises a plurality of selection actuators, including at least a right selection actuator and a left selection actuator; and
   the configuration circuit causes the handedness of the device to be left-handed, and the right selection actuator to correspond to a primary function and the left selection actuator to correspond to a secondary function when the first sensor is activated.

5. The computer input device of claim 3 wherein:
   the control circuit further comprises a plurality of selection actuators, including at least a right selection actuator and a left selection actuator; and
   the configuration circuit causes the handedness of the device to be left-handed, and the right selection actuator to correspond to a primary function and the left selection actuator to correspond to a secondary function when the first sensor is not activated.

6. The computer input device of claim 3 wherein:
   the control circuit further comprises a plurality of selection actuators, including at least a right selection actuator and a left selection actuator; and
   the configuration circuit causes the handedness of the device to be right-handed, and the left selection actuator to correspond to a primary function and the right selection actuator to correspond to a secondary function when the first sensor is activated.

7. The computer input device of claim 3 wherein:
   the control circuit further comprises a plurality of selection actuators, including at least a right selection actuator and a left selection actuator; and the configuration circuit causes the handedness of the device to be right-handed and the left selection actuator to correspond to a primary function and the right selection actuator to correspond to a secondary function when the first sensor is not activated.

8. A computer input device comprising:

an output transmitter for communicating with a computer; and a control circuit coupled to the output transmitter, the control circuit comprising:

at least a first sensor and a second sensor; and a configuration circuit coupled to the first sensor to automatically determine the handedness of the computer input device independent of motion of any component of the computer input device; and the configuration circuit causes the computer input device to be in first-handed mode when the first sensor is activated, or causes the computer input device to be in a second-handed mode when the second sensor is activated.

9. The computer input device according to claim 8 wherein the first and second sensor is selected from a group comprising an optical driver/receiver, a piezoelectric transducer, a touch plate, and a temperature sensor.

10. The computer input device of claim 8 wherein:

the control circuit further comprises a plurality of selection actuators, including at least a right selection actuator and a left selection actuator; and the configuration circuit causes the first-handed mode to be right-handed and the left selection to correspond to a primary function and the right selection actuator to correspond to a secondary function when the first sensor is activated.

11. The computer input device of claim 8 wherein:

the control circuit further comprises a plurality of selection actuators, including at least a right selection actuator and a left selection actuator; and the configuration circuit causes the second-handed mode to be left-handed, and the right selection actuator to correspond to a primary function and the left selection actuator to correspond to a secondary function when the second sensor is activated.

12. The computer device according to claim 8 further comprising a signal generator which generates one of the following signals: a first signal indicating the handedness of the computer input device and an error signal when either both the first and second sensor is activated, or if neither the first nor second sensor is activated.

13. The computer device according to claim 12 wherein the first signal and the error signal is a visual signal.

14. The computer input device according to claim 13 wherein the visual signal is a message on a computer display.

15. The computer input device according to claim 13 wherein the visual signal is a light indicator on the computer input device.

16. The computer device according to claim 12 wherein the first signal and the error signal is an audible signal.

17. A computer input device comprising:

(a) an output transmitter for communicating with a computer;

(b) a first location for receiving a first digit of a user's first hand;

(c) a second location for receiving a second digit of a user's second hand;

(d) a control circuit coupled to the output transmitter, wherein the control circuit comprises:

(i) a plurality of selection actuators, including at least a right selection actuator and a left selection actuator, each selection actuator operatively connected to the computer;

(ii) at least a first sensor located proximate to either of said locations; and (iii) a configuration circuit to automatically determine whether the user is operating the computer input device with the first hand or the second hand independent of motion of any component of the computer input device, wherein the configuration circuit causes the computer input device to be in a first-handed mode when the first sensor is activated, and causes the computer input device to be in a second-handed mode when the first sensor is not activated.

18. The computer input device according to claim 17 wherein the first sensor is selected from a group comprising an optical driver/receiver, piezoelectric transducers, touch plates, and a temperature sensor.

19. The computer input device according to claim 17 wherein the computer input device is selected from a group comprising a mouse and a trackball.

20. The computer input device according to claim 17 wherein:

the control circuit further comprises a signal generator which generates one of the following signals: a first signal indicating the handedness of the computer input device and an error signal when either both the first and second sensor is activated, or if neither the first nor second sensor is activated.

21. The computer device according to claim 20 wherein the first signal and the error signal is a visual signal.

22. The computer input device according to claim 21 wherein the visual signal is a message on a computer display.

23. The computer input device according to claim 21 wherein the visual signal is a light indicator on the computer input device.

24. The computer device according to claim 20 wherein the first signal and the error signal is an audible signal.

25. A computer input device comprising:

(a) an output transmitter for communicating with a computer;

(b) a first location for receiving a first digit of a user's first hand;

(c) a second location for receiving a second digit of a user's second hand;

(d) a control circuit coupled to the output transmitter, wherein the control circuit comprises:

(i) a plurality of selection actuators, including at least a right selection actuator and a left selection actuator, each selection actuator operatively connected to the computer;

(ii) at least a first sensor located proximate to either of said locations and at least a second sensor located proximate the other of the first or second location; and (iii) a configuration circuit which automatically, independent of motion of any component of the computer input device, determines the computer input device to be in a first-handed mode when the first senor is activated, and in a second-handed mode when the second sensor is activated.

* * * * *